United States Patent

Martin et al.

[15] 3,691,832
[45] Sept. 19, 1972

[54] METHOD OF ANALYZING CIRCULATION OF ELECTROLYTE IN ELECTROREFINING CELLS

[72] Inventors: Richard G. Martin; William M. Tuddenham; Joseph M. Lebrizz, all of Salt Lake City, Utah

[73] Assignee: Kennecott Copper Corporation, New York, N.Y.

[22] Filed: Feb. 13, 1970

[21] Appl. No.: 11,104

[52] U.S. Cl. .................................................. 73/204
[51] Int. Cl. ............................... G01f 1/00, G01p 5/10
[58] Field of Search ........................................... 73/204

[56] References Cited

UNITED STATES PATENTS

| | | |
|---|---|---|
| 3,246,515 | 4/1966 | Martino et al. ............... 73/204 |
| 2,800,018 | 7/1957 | Phillips et al. ................ 73/204 |
| 1,295,046 | 2/1919 | Lohnes ......................... 73/212 |
| 2,947,938 | 8/1960 | Bennett ........................ 73/204 |
| 3,068,693 | 12/1962 | Ferran et al. ................. 73/204 |
| 2,875,612 | 3/1959 | Reed ............................ 73/204 |

OTHER PUBLICATIONS

Penman et al. " A Portable Thermistor Bridge for Micro-Meteorology Among Growing Crops" in J. of Scientific Instruments March 1949, Vol. 26 No. 3.

*Primary Examiner*—Richard C. Queisser
*Assistant Examiner*—Herbert Goldstein
*Attorney*—John L. Sniado, Mallinckrodt and Cornaby and Philip A. Mallinckrodt

[57] ABSTRACT

Electrolyte flow patterns in an electrolytic cell utilizing anodes and cathodes of plate formation, particularly an electrorefining cell such as is utilized for producing pure cathode copper from fire-refined, impure, blister copper anodes, are determined electrically by taking flow-indicating measurements and temperature-indicating measurements simultaneously and in proximity to each other at selected locations within the cell. Sets of measurements taken at predetermined locations between and surrounding selected anode-cathode pairs are employed to produce corresponding rate-of-flow contour charts depicting relative rates of electrolyte flow at the respective predetermined locations within the respective selected areas. The apparatus employed includes a slender probe, that carries a heated flowrate-sensing thermistor and an unheated temperature-compensating thermistor in closely spaced relationship at its tip, and Wheatstone bridge circuitry with read-out instrumentation.

1 Claim, 9 Drawing Figures

PATENTED SEP 19 1972

INVENTORS
RICHARD G. MARTIN
WILLIAM M. TUDDENHAM
BY JOSEPH M. LEBRIZZI

Mallinckrodt and Cornsby
ATTORNEYS

PATENTED SEP 19 1972 3,691,832

INVENTORS
RICHARD G. MARTIN
WILLIAM M. TUDDENHAM
BY JOSEPH M. LEBRIZZI

ATTORNEYS 3,691,832

METHOD OF ANALYZING CIRCULATION OF ELECTROLYTE IN ELECTROREFINING CELLS

BACKGROUND OF THE INVENTION

1. Field

The invention is in the field of measuring rates of flow of fluids and of apparatus for doing so.

2. Objective

The primary objective in the making of the present invention was to provide for determining electrolyte circulation patterns in electrolytic cells employing closely spaced anodes and cathodes of plate formation.

3. State of the Art

Heretofore, there has been no way of effectively analyzing circulation of electrolyte in electrorefining cells or the like employing closely spaced plate electrodes, nor of measuring rates of flow of electrolyte in such cells. Although electrical flow meters of various types are well known, see for example U.S. Pat. Nos. 3,242,729; 3,085,431; 3,081,628; 3,068,693; and 2,728,225, none of these are intended for nor capable of use in effecting the purposes of the present invention.

BRIEF SUMMARY OF THE INVENTION

The method of the invention involves taking rate of flow measurements of the electrolyte circulating in an electrorefining cell or the like at a number of predetermined locations in the narrow spaces between and surrounding selected pairs of anode and cathode plate electrodes, and utilizing such measurements to provide visual representations of the varying flow rates of the electrolyte within given circulation areas within the cell.

This is best accomplished by inserting an elongate and slender probe into the electrolyte of such a cell at a predetermined location adjacent to a selected pair of anode and cathode plate electrodes and obtaining a rate of flow measurement at that location, followed by similarly obtaining rate of flow measurements for other predetermined locations between and surrounding that pair of electrodes and other selected pairs of electrodes that can be considered representative of the overall circulation pattern for the cell.

The probe carries a flow-sensitive thermistor and a temperature-sensitive thermistor in closely spaced relationship at its tip, and such thermistors are electrically connected into Wheatstone bridge circuitry that may comprise two separate bridge circuits provided with relatively high and relatively low voltage sources, respectively, so the flow-sensitive thermistor will be heated internally while the temperature-sensitive thermistor will not be. Read-out devices are provided for the respective circuits so measurements can be taken and temperature-compensated rate-of-flow values obtained. Alternately, bridge circuitry with direct, temperature-compensated readout can be employed.

The temperature-compensated rate-of-flow values are advantageously employed to make up comparative contour charts depicting relative rates of flow of electrolyte at the predetermined locations for the respective selected pairs of electrodes.

THE DRAWINGS

The best mode presently contemplated of carrying out the invention is illustrated in the accompanying drawings, in which:

FIG. 1 represents a fragmentary schematic view in longitudinal vertical section of an electrorefining cell, with probe inserted for taking a rate of flow measurement in accordance with the method of the invention;

FIG. 2, a block diagram of the measurement system employed;

FIG. 3, a circuit diagram corresponding to the block diagram of FIG. 2;

FIG. 4, a fragmentary elevation from the standpoint of the line 4—4, FIG. 1, drawn to an enlarged scale;

FIG. 5, a schematic view taken on the line 505 of FIG. 1 with probe excluded and drawn to a somewhat reduced scale showing a typical grid pattern of selected locations for taking a set of rate-of-flow measurements;

FIG. 6, a graph with temperature sensitivity curves used to correct rate of flow read-out measurements; and FIG. 7, 8, and 9, typical comparative rate-of-flow contour charts made up from measurements taken in accordance with FIG. 5 at different pairs of anode and cathode plate electrodes.

DETAILED DESCRIPTION OF ILLUSTRATED EMBODIMENT

Figure 1:
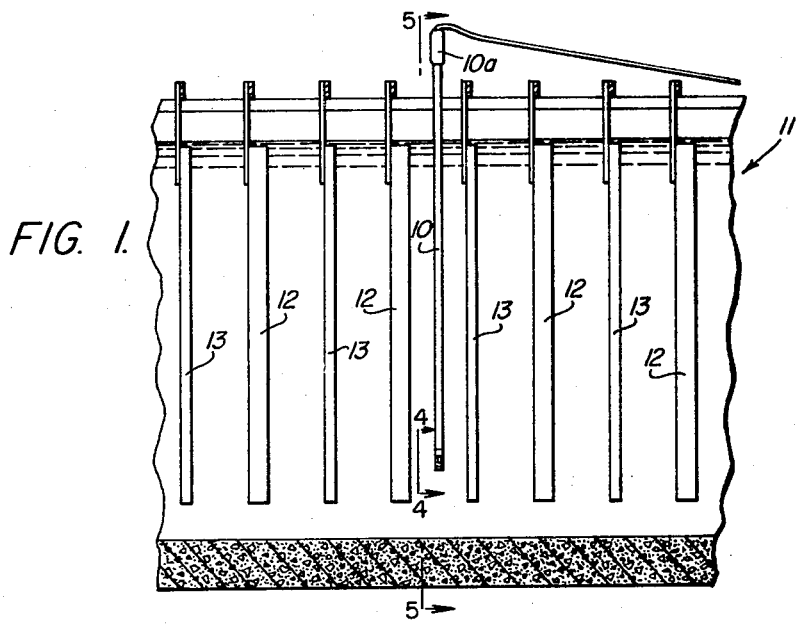
Figure 2:
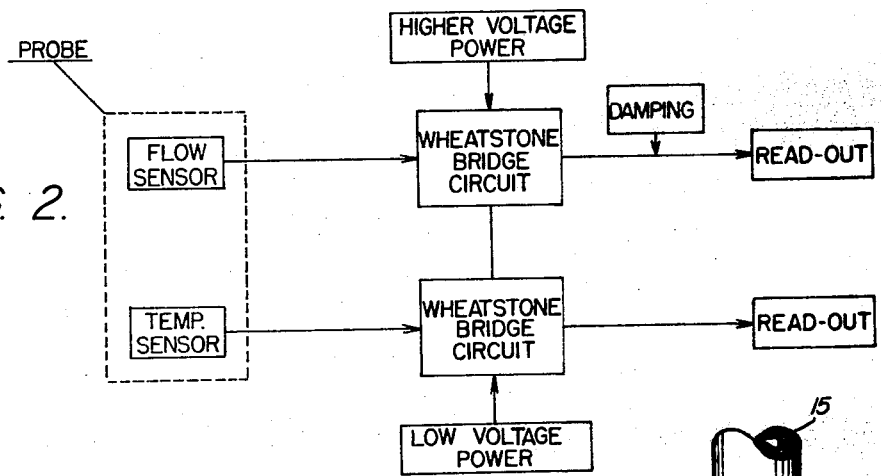

In carrying out the method of the invention, an elongate and slender probe 10, FIG. 1, is inserted into the electrolyte of an electrorefining cell 1 or the like 11 at a predetermined location adjacent to a selected pair of anode and cathode plate electrodes 12 and 13, respectively. The probe is successively moved from predetermined location to predetermined location between and surrounding the plate electrodes of the pair in accordance with a grid pattern of such locations 14, FIG. 5, following the taking of electrical measurements at the individual locations, and this is repeated for corresponding locations between and surrounding the plate electrodes of other selected pairs in the analyzing of electrolyte circulation within the cell.

Figure 3:
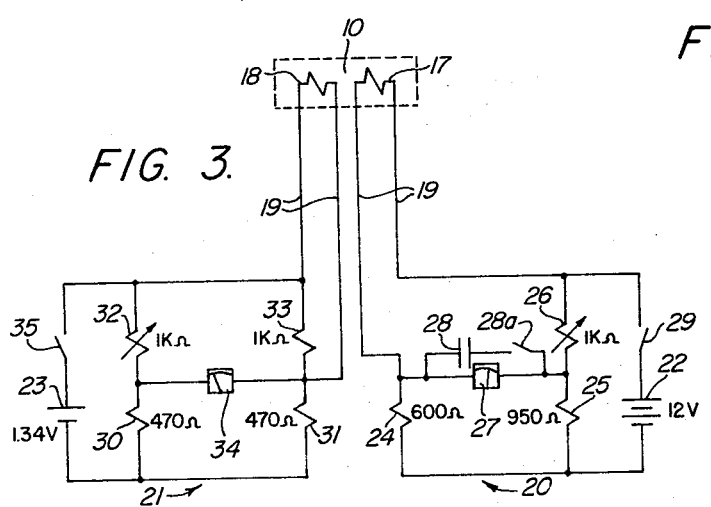
Figure 4:
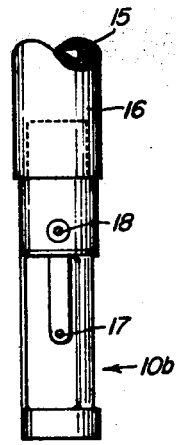

The probe 10 is typically a four foot length of ¼ inch stainless steel tubing 15, FIG. 4, tightly covered by a heat-shrunk sleeve 16 of plastic for electrical insulating purposes and having a handle 10a at its upper end and a tip fitting 10b attached to its lower end. Such fitting carries a thermistor 17 axially thereof and a second thermistor 18 in closely spaced relationship therewith at the side of the fitting. The fitting itself is formed as an open framework of stainless steel to protect thermistor 17 from accidental damage. Pairs of electrical leads 19 extend upwardly through the tubing from the respective thermistors to connections with independent Wheatstone bridge circuits 20 and 21, FIG. 3.

Thermistor 17 senses rate-of-flow of the electrolyte in terms of heat lost from the thermistor to the electrolyte. For this purpose, its electrical bridge circuit 20 has a voltage source 22 of relatively high voltage, e.g. an ordinary 12 volt battery, so as to generate heat in the thermistor by reason of the internal resistance thereof. Thermistor 18 senses temperature of the electrolyte and is unheated. Its electrical bridge circuit 21 has a relatively low and stable voltage source 23, e.g. a commercial mercury cell of 1.34 volts.

In the form illustrated, bridge circuit 20 comprises a fixed resistor 24 as one leg of the circuit, a second fixed resistor 25 as another leg, a variable resistor 26 as a third leg, and the flow thermistor 17 as a fourth leg. A zero center or null meter 27, or if desired a high input impedance recorder, is connected between the legs of the bridge as read-out means. Variable resistor 26 is preferably a 10-turn resistor with a graduated dial used to balance the bridge against the signal from flow thermistor 17. A damping circuit 28 with switch 28a provides a means for averaging the signal from thermistor 17 when erratic flow conditions in the cell 11 prevail thereby quieting read-out.

Rate-of-flow can be read directly from the resistor 26 at zero balance of meter 27 when the dial of resistor 26 has been calibrated for direct rate-of-flow measurements. For automatic recording using a standard recording device, the bridge 20 is balanced initially and variations in read-out are calibrated to provide rate-of-flow measurements which are recorded.

An important consideration in the bridge design is that sufficient current be supplied to flow thermistor 17 to heat it above ambient temperatures over the range of temperatures encountered in the electrolyte. The required current flow and span for resistor 26 is established for the temperature range encountered by choosing appropriate fixed resistances 24 and 25.

An on-off switch 29 is provided for shutting off the current when bridge 20 is not in use.

Bridge circuit 21 comprises two fixed resistors 30 and 31 providing respective legs of the circuit, a variable resistor 32 providing a third leg, and a fixed resistor 33 in parallel with temperature thermistor 18 providing a fourth leg for the circuit. Thermistor 18 is shunted with fixed resistor 33 to improve linearity. Alternatively, a thermistor can be employed which is already linearized. Variable resistor 32 provides adjustment over a suitable range of temperatures whose span is determined by the two fixed resistors 30 and 31. A microammeter 34 or other read-out device, such as a high-impedance recorder, is calibrated to provide readings over the temperature range. An on-off switch 35 provides for cutting out this circuit 21 when the temperature of the electrolyte is known and not subject to variation.

As noted above, the measurement of both flow-rate and temperature of electrolyte are dependent on changes in temperature of the thermistors 17 and 18. It has been found that in a typical electrorefining cell the temperature of the electrolyte varies by approximately 4° F. from the inlet to the outlet. A similar temperature difference exists between the electrolyte at the surface of the cell and at the bottom. For these reasons, both temperature and flow readings are taken simultaneously, and corrections in flow rates are made for varying temperatures of the electrolyte. The temperature-adjusted flow rates can then be compared with each other in an analysis of electrolyte circulation.

Figure 6:
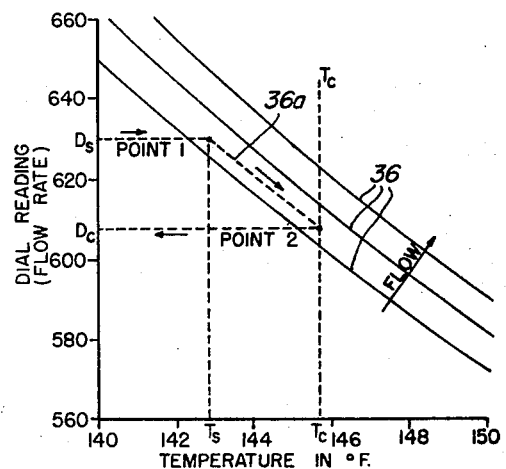

For obtaining the desired temperature-adjusted flow rates, several temperature sensitivity curves 36, FIG. 6, are drawn using data obtained by holding the rate of flow constant and varying the temperatures of the electrolyte for several different flow rates, three as illustrated.

In using the sensitivity curves 36, a read-out flow value $D_s$ is obtained from the dial of variable resistance 26 in bridge circuit 20. This is located on the ordinate axis of the graph of FIG. 6, and the arrow is followed laterally to the value of the corresponding temperature, as measured by the temperature thermistor, located on a vertical line $T_s$ erected from the abscissa axis. This establishes a "Point 1" on the basis of experimental data provided by the probe. In order to determine what the flow rate would be for a chosen mean temperature, a line 36a parallel to the sensitivity curves 36 is drawn from Point 1 to a point on a vertical line $T_c$ erected from the abscissa. This locates a "Point 2" on the curve 36a, from which the flow rate $D_c$ is found on the ordinate axis. $D_c$ is the corrected flow rate at the chosen mean temperature $T_c$.

In order to prepare rate-of-flow contour charts for selected anode-cathode pairs along the length of the electrolytic cell, experimental data is taken at other predetermined locations between and surrounding the respective pairs along a standard grid pattern, and corrected flow rates are obtained for such experimental data in the manner explained above.

Figure 5:
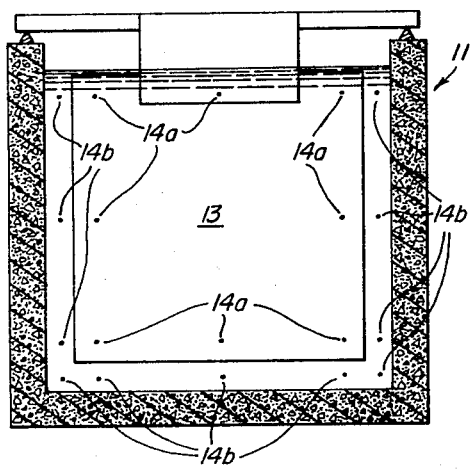

The grid pattern illustrated in FIG. 5 is typical. It contains nine equally spaced locations 14a in a 3 × 3 matrix between the electrode plates of a pair on the downstream face of the cathode, with eleven additional locations 14b peripherally of the plates.

Figure 7:
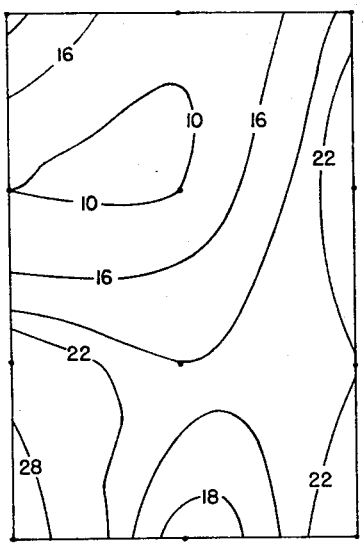
Figure 8:
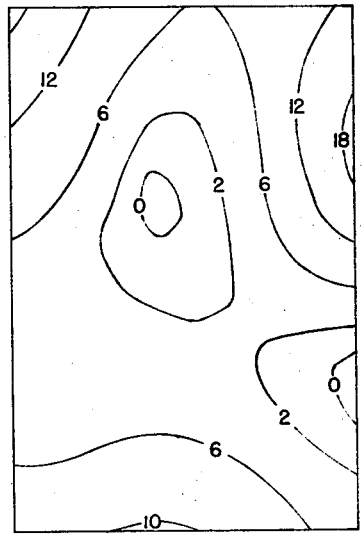
Figure 9:
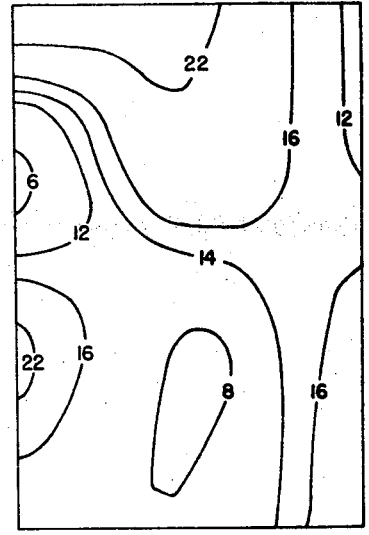

The rate-of-flow contour charts, see FIGS. 7–9, are prepared from the corrected flow rates corresponding to the several predetermined locations in the respective grid patterns. For this purpose, it is advantageous to subtract a common number from each of these corrected flow rates so as to obtain smaller numbers that can be more easily worked with, but preserving the same relative values. The contours for the respective charts may be plotted by computer in well known manner so as to present a visual representation of the relative flow velocities at the several predetermined locations for each of the grid patterns and so enable effective analysis of electrolyte circulation in the cell.

Although the invention was developed primarily for electrorefining cells, it can be utilized as well for various other electrolytic cells utilizing plate electrodes, e.g. electrowinning cells. Moreover, although the use of separate bridge circuits and a temperature to flow rate graph is a convenient way of obtaining temperature-corrected flow rates, such flow rates can be obtained as direct read-out from more complicated bridge circuitry providing for automatic temperature compensation.

Whereas this invention is here illustrated and described with respect to a certain preferred form thereof, it is to be understood that many variations are possible without departing from the inventive concepts particularly pointed out in the claims.

We claim:

1. A method of analyzing circulation of electrolyte in electrorefining cells provided with anode and cathode plate electrodes, comprising taking rate of flow measurements of the electrolyte in such a cell at a predetermined location adjacent to a pair of said electrodes; obtaining similar rate of flow measurements at other predetermined locations of a set of said locations between and surrounding the electrodes of said pair; obtaining respective sets of similar rate of flow measurements with respect to other pairs of said electrodes at corresponding predetermined locations; and making comparative contour charts depicting relative rates of flow of electrolyte at the predetermined locations for the respective pairs of electrodes for which flow measurements were made.

* * * * *

PO-1050
(5/69)

UNITED STATES PATENT OFFICE
CERTIFICATE OF CORRECTION

Patent No. 3,691,832            Dated September 19, 1972

Inventor(s) Richard G. Martin, William M. Tuddenham & Joseph M. Lebrizz

It is certified that error appears in the above-identified patent and that said Letters Patent are hereby corrected as shown below:

The last name of the third listed inventor should be Lebrizzi rather than "Lebrizz".

Signed and sealed this 13th day of February 1973.

(SEAL)
Attest:

EDWARD M. FLETCHER, JR.            ROBERT GOTTSCHALK
Attesting Officer                   Commissioner of Patents